US010637581B2

(12) United States Patent
Woodside et al.

(10) Patent No.: US 10,637,581 B2
(45) Date of Patent: Apr. 28, 2020

(54) DYNAMIC RANGE FOR A HETERODYNE OPTICAL CHANNEL MONITOR

(71) Applicant: Lumentum Operations LLC, Milpitas, CA (US)

(72) Inventors: Shane H. Woodside, Ottawa (CA); Jiamin Zheng, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/299,807

(22) Filed: Mar. 12, 2019

(65) Prior Publication Data
US 2019/0296824 A1    Sep. 26, 2019

Related U.S. Application Data

(60) Provisional application No. 62/645,554, filed on Mar. 20, 2018.

(51) Int. Cl.
*H04B 10/61* (2013.01)
*H04B 10/079* (2013.01)
*H04J 14/06* (2006.01)

(52) U.S. Cl.
CPC ..... *H04B 10/616* (2013.01); *H04B 10/07953* (2013.01); *H04B 10/07955* (2013.01); *H04B 10/07957* (2013.01); *H04B 10/614* (2013.01); *H04J 14/06* (2013.01)

(58) Field of Classification Search
CPC ............ H04B 10/616; H04B 10/07953; H04B 10/07957; H04B 10/07955; H04B 10/614; H04J 14/06
See application file for complete search history.

(56) References Cited

U.S. PATENT DOCUMENTS 4,989,201 A * 1/1991 Glance .................. H01S 3/1303
372/32
9,490,895 B2 11/2016 Frisken et al.
(Continued)

OTHER PUBLICATIONS

Rosenfeldt et al. "Miniaturized Heterodyne Channel Monitor with Tone Detection", 2015 Optical Fiber Communications Conference and Exhibition (OFC), Mar. 22-26, 2015, 3 pages.
(Continued)

*Primary Examiner* — Casey L Kretzer
(74) *Attorney, Agent, or Firm* — Harrity & Harrity, LLP

(57) ABSTRACT

An optical channel monitor (OCM) may include a modulator to provide a modulation signal and a local oscillator (LO) to provide a modulated LO signal. The modulated LO signal may be created by modulating an LO signal based on the modulation signal. The OCM may include a mixer to generate a pair of mixed optical signals. The pair of mixed optical signals may be generated based on mixing the modulated LO signal and an input optical signal. The OCM may include an optical detector to provide, based on the pair of mixed optical signals, a first electrical signal corresponding to a coherent mixture of the input optical signal and the modulated LO signal. The OCM may include a synchronous demodulator to provide, based on the first electrical signal and the modulation signal, a second electrical signal representative of the optical power spectrum of the input optical signal.

23 Claims, 5 Drawing Sheets

(56) References Cited

U.S. PATENT DOCUMENTS

| | | | | |
|---|---|---|---|---|
| 2002/0130255 A1* | 9/2002 | Baney | ............... | H04B 10/07 250/227.19 |
| 2004/0005000 A1* | 1/2004 | Shake | ............. | H04B 10/07953 375/228 |
| 2006/0120733 A1* | 6/2006 | Tucker | ............... | H04B 10/60 398/204 |
| 2015/0139667 A1* | 5/2015 | Takeuchi | ............. | G02F 1/0147 398/214 |

OTHER PUBLICATIONS

Zhang et al. "Towards full band colorless reception with coherent balanced receivers", Opt. Express 20, 10339-10352 (2012), 14 pages.

\* cited by examiner

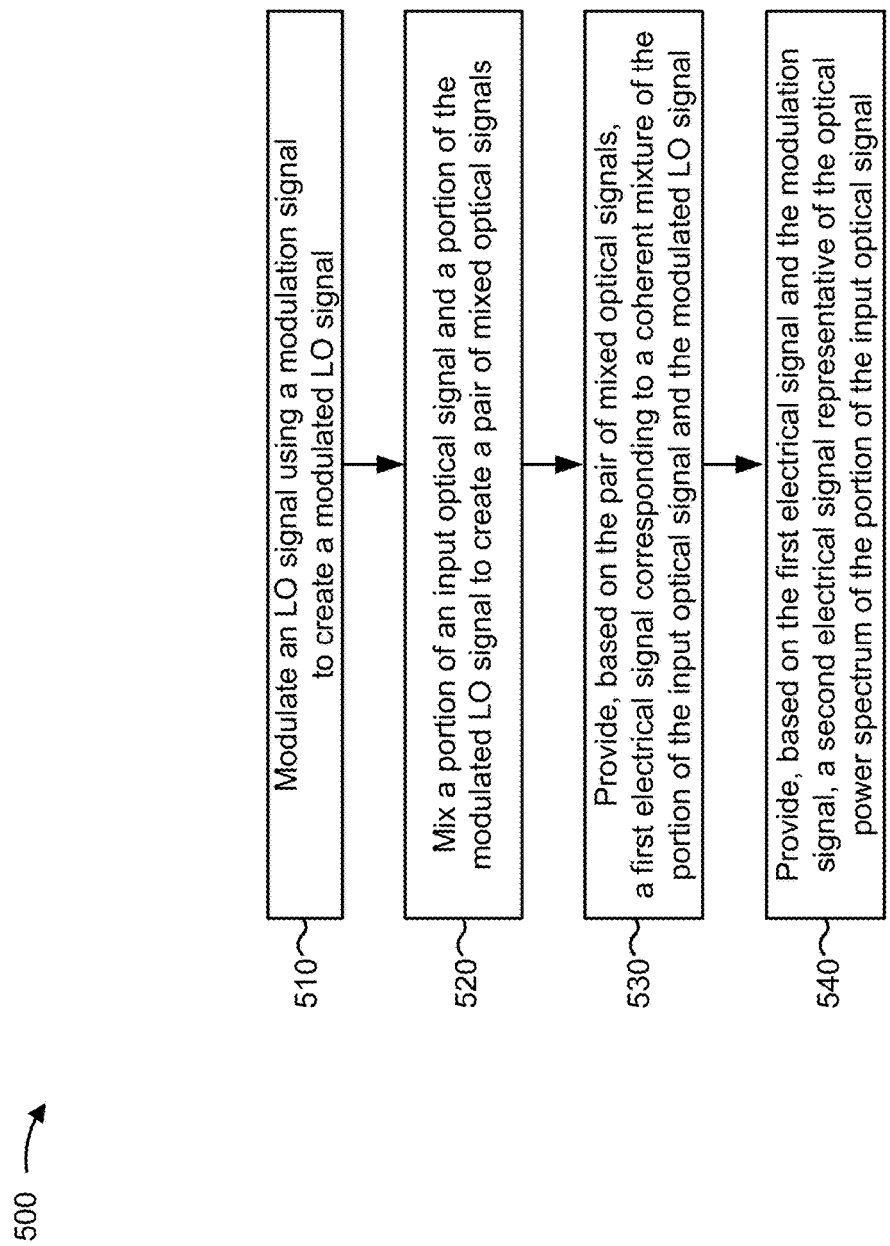

US 10,637,581 B2

DYNAMIC RANGE FOR A HETERODYNE OPTICAL CHANNEL MONITOR

RELATED APPLICATION

This application claims priority under 35 U.S.C. § 119 to U.S. Provisional Patent Application No. 62/645,554, filed on Mar. 20, 2018, the content of which is incorporated by reference herein in its entirety.

TECHNICAL FIELD

The present disclosure relates to an optical channel monitor (OCM) and, more particularly, to an OCM that utilizes local oscillator (LO) modulation in order to improve dynamic range.

BACKGROUND

An optical channel monitor (OCM) is a device capable of measuring an optical power in a wavelength channel of an optical signal. An OCM can be connected to a point in an optical network in order to measure, for example, power, frequency, and other characteristics of an optical channel at that point. In some cases, an OCM may scan multiple wavelength channels in order to measure optical power in the multiple channels (e.g., across a range of wavelengths). For example, an OCM may be used to monitor channels in a wavelength division multiplexed (WDM) system in which wavelength channels are multiplexed into a common carrier signal for transmission across the optical network (e.g., a dense wavelength division multiplexed (DWDM) system in which wavelength channels are spaced apart by a frequency of 50 gigahertz (GHz), or the like).

SUMMARY

In some implementations, an optical channel monitor (OCM) may include: a modulator to provide a modulation signal; a local oscillator (LO) (e.g., a wavelength tunable LO) to provide a modulated LO signal, the modulated LO signal being created by modulating an LO signal based on the modulation signal; a mixer to generate a pair of mixed optical signals, the pair of mixed optical signals being generated based on mixing the modulated LO signal and an input optical signal; an optical detector to provide, based on the pair of mixed optical signals, a first electrical signal corresponding to a coherent mixture of the input optical signal and the modulated LO signal; and a synchronous demodulator to provide, based on the first electrical signal and the modulation signal, a second electrical signal representative of the optical power spectrum of the input optical signal.

In some implementations, an OCM may include: an LO to provide an LO output; a first mixer to generate a first pair of mixed optical signals based on mixing a first portion of the LO output and a first input optical signal, the first input optical signal being associated with a first port; a second mixer to generate a second pair of mixed optical signals based on mixing a second portion of the LO output and a second input optical signal, the second input optical signal being associated with a second port; a first optical detector to provide, based on the first pair of mixed optical signals, a first electrical signal corresponding to a coherent mixture of the first input optical signal and the first portion of the LO output; and a second optical detector to provide, based on the second pair of mixed optical signals, a second electrical signal corresponding to a coherent mixture of the second input optical signal and the second portion of the LO output.

In some implementations, a method may include: modulating, by a modulator of an OCM, an LO signal to create a modulated LO signal; mixing, by a mixer of the OCM, a portion of an input optical signal and a portion of the modulated LO signal to create a pair of mixed optical signals; providing, by an optical detector of the OCM and based on the pair of mixed optical signals, a first electrical signal corresponding to a coherent mixture of the portion of the input optical signal and a modulated LO signal; and providing, by a synchronous demodulator of the OCM, a second electrical signal based on the first electrical signal and the modulation signal, wherein the second electrical signal is representative of an optical power spectrum of the portion of the input optical signal.

BRIEF DESCRIPTION OF THE DRAWINGS

FIG. 5 is a flow chart of an example process for optical channel monitoring as performed by the improved OCM described herein.

DETAILED DESCRIPTION

Figure 1:
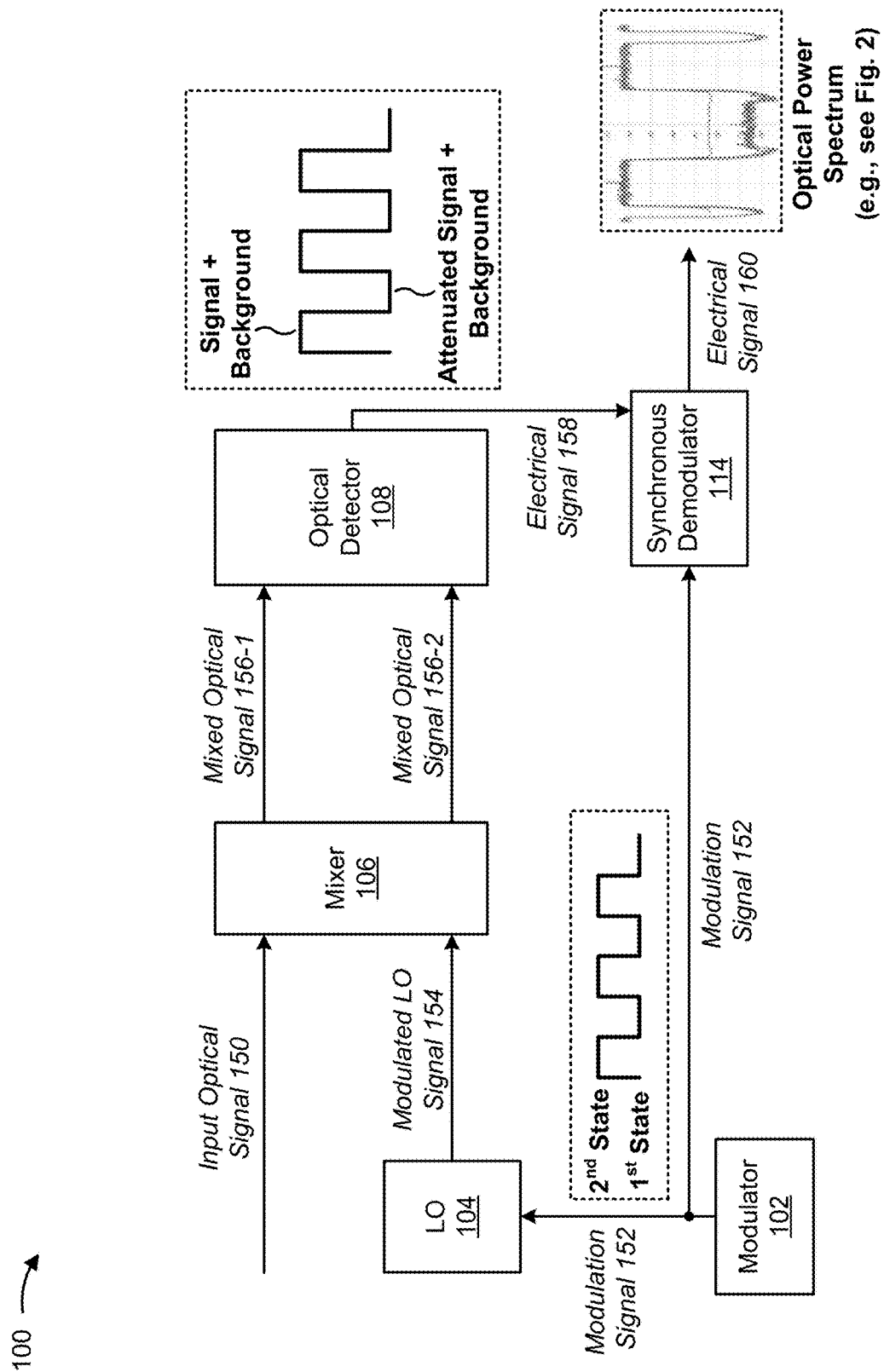
FIG. 1 is a diagram of an example optical channel monitor (OCM) with improved dynamic range, as described herein.

The following detailed description of example implementations refers to the accompanying drawings. The same reference numbers in different drawings may identify the same or similar elements.

A traditional OCM uses a filter-based technique in order to monitor an optical power spectrum of an input optical signal (e.g., an optical power on one or more wavelength channels of the input optical signal). However, a filter-based OCM has a limited spectral resolution, which may not be sufficient to satisfy a requirement in an application that requires detection of relatively fine spectral features, such as WDM super-channels with densely packed sub-carriers.

A coherent heterodyne OCM (herein referred to as a coherent OCM) is capable of improved spectral resolution (e.g., as compared to a filtered-based OCM) and, therefore, may be better suited to satisfy requirements of a given application. However, a conventional coherent OCM has a limited dynamic range (e.g., approximately 20 dB or less). The limited dynamic range may result from signal-signal beat noise (herein referred to as beat noise) and detector noise within the optical system. Notably, the beat noise is not completely subtracted out unless the optical mixer is perfectly balanced, and the pair of photodetectors must have identical responsivities. In order to combat this issue, stringent component requirements may be needed, such as a local oscillator (LO) that provides an LO signal with a relatively high optical power (e.g., as compared to the input optical signal), and a mixer with tightly controlled imbalance. Notably, limited dynamic range presents a significant problem particularly when there are many wavelength channels present in the spectrum of an input optical signal being analyzed, and an optical power of the input optical signal is relatively close to an optical power of the LO signal.

As indicated above, the dynamic range issue arises in the conventional coherent OCM because the optical power of the input optical signal is relatively close to the optical power of the LO signal (unlike typical heterodyne detection, where the power of the input signal is typically significantly less than the power in the LO signal). For example, in a typical optical system, a monitoring point may be after a booster erbium-doped fiber amplifier (EDFA). The EDFA may provide an optical signal with an optical power of approximately 24 dBm, and a tap may be used to direct 1% of the optical power of the optical signal to the OCM. In this example, 1% of the optical power is approximately 4 dBm, meaning that an optical power of an input optical signal at the OCM is approximately 4 dBm. In a typical case, an optical power of the LO signal may be relatively close to 4 dBM (i.e., the optical power of the LO signal is not significantly greater than the optical power of the input optical signal). An input signal optical power that is relatively close to the LO signal optical power manifests itself in the spectra of the conventional coherent OCM as a noise floor. As optical power of the input optical signal becomes closer to the optical power of the LO signal, the noise floor raises, thereby decreasing the dynamic range of the OCM. If an optical power of a signal in a wavelength channel is below the noise floor, the OCM may be unable to detect that the signal is present in the wavelength channel, or may incorrectly determine that the wavelength channel includes only noise.

Beat noise is common mode and, in theory, can be removed by a balanced detector circuit in a coherent OCM. However, in practice, achieving sufficiently balanced detection (e.g., a system common mode rejection ratio system (CMRR) above 25 dB) across an applicable wavelength range and operational temperature range is difficult since control of imbalance of the optical and electrical components of the conventional coherent OCM cannot be easily or reliably achieved.

One solution to improve dynamic range is to increase the optical power of the LO signal in order to cause the optical power in the LO signal to be significantly higher than the optical power in the input optical signal (e.g., as is the case in the typical heterodyne detection system). However, increasing the LO signal power in order to improve dynamic range eventually becomes impractical or even impossible (e.g., when the LO laser has a limited output power, such as 16 dB-milliwatts (dBm)). Another solution to improve dynamic range is to implement the coherent OCM using free-space optical components in order to achieve a balanced mixer. However, the use of free-space optical components increases cost and complexity of the coherent OCM and still may not be sufficiently balanced.

Some implementations described herein provide a coherent OCM with an improved dynamic range (e.g., as compared to the conventional coherent OCM described above). In some implementations, the coherent OCM with improved dynamic range (herein referred to as an improved coherent OCM) may utilize an intensity modulated LO signal, and synchronous detection at a frequency of the modulation. As described below, this allows undesired beat noise to be removed, thereby providing improved dynamic range performance and reducing a required optical power of the LO signal. As described in further detail below, the improved coherent OCM can be at least partially implemented using integrated optics, which reduces cost and complexity of the improved coherent OCM (e.g., as compared to a coherent OCM implemented using free-space optical elements).

In some implementations, as described below, the improved coherent OCM reduces the optical power requirement for the LO signal, while maintaining or even improving dynamic range of the improved coherent OCM (e.g., as compared to a conventional coherent OCM). The reduction in the required optical power of the LO signal eases performance requirements for associated optics, thus enabling the potential for low cost implementations of the improved coherent OCM (e.g., planar lightwave circuit (PLC), silicon photonics integrated devices, integrated optical components, and/or the like). Further, the reduction in the required optical power of the LO signal at a mixer allows the LO signal to be split to multiple paths, thereby enabling simultaneous monitoring of multiple input optical signals, as described in further detail below.

FIG. 1 is a diagram of an example optical channel monitor (OCM) with improved dynamic range (herein referred to as OCM 100). As shown in FIG. 1, OCM 100 may include a modulator 102, an LO 104, a mixer 106, an optical detector 108, and a synchronous demodulator 114. Details of these components of OCM 100 are described below, followed by a description of an example operation of OCM 100. In some implementations, OCM 100 may be at least partially implemented as an integrated optical device (e.g., one or more components of OCM 100 can be implemented using PLC, using silicon photonics, as integrated optical components, and/or the like).

Modulator 102 includes a component to provide a modulation signal 152 (e.g., an electrical signal) to be used in association with creating modulated LO signal 154. For example, modulation signal 152 may be used for modulating an LO signal generated by LO 104. In some implementations, modulation signal 152 may be used for intensity modulation (e.g., such that modulated LO signal 154 is an intensity modulated signal). In some implementations, as shown in FIG. 1, modulator 102 may be arranged to provide modulation signal 152 to LO 104 and to synchronous demodulator 114.

In some implementations, a modulation frequency, associated with modulation signal 152, may be greater than a scanning speed of the LO lasing frequency, and less than an intermediate frequency (IF) electrical filter frequency. For example, the scanning speed may be on the order of tens of microseconds (μs) per spectral datapoint, and the IF may be approximately 100 megahertz (MHz). In this example, the frequency of modulation signal 152 may be in a range from approximately 0.1 MHz to approximately 100 MHz. In some implementations, modulation signal 152 may directly modulate the LO signal. In other implementations, in order to modulate the LO signal while maintaining a stable output frequency during scanning, modulation signal 152 may drive a modulator that is separate from the LO 104 (e.g., an optical modulator integrated on a same photonic circuit as LO 104, or an optical modulator as a separate component).

LO 104 includes an LO laser to provide a modulated LO output (e.g., modulated LO signal 154). For example, LO 104 may include an LO laser capable of providing an LO signal that has been modulated using modulation signal 152. In some implementations, a wavelength of the LO signal and, therefore, modulated LO signal 154, may be adjusted, changed, modified, tuned, and/or the like, as OCM 100 scans a bandwidth associated with input optical signal 150. In other words, in some implementations, LO 104 may be a wavelength tunable LO.

In some implementations, modulated LO signal 154 may be created by modulating an LO signal, generated by LO 104, based on modulation signal 152. In some implementations, modulated LO signal 154 may be created such that an intensity of modulated LO signal 154 varies over time between a first state and a second state. The first state may include, for example, an off-state in which modulated LO signal 154 has an optical power at or near 0 mW. while the second state may include, for example, an on state in which modulated LO signal 154 has an optical power that is greater than 0 mW (e.g., 4 dBm). In other words, in some implementations, modulation signal 152 may utilize square wave amplitude modulation in association with creating modulated LO signal 154. In some implementations, another modulation technique may be utilized in association with creating modulated LO signal 154. For example, a 3 dB modulation may be used (e.g., such that the optical power of modulated LO signal 154 in the first state is equal to approximately 50% of the optical power of modulated LO signal 154 in the second state). In general, any modulation technique that causes the optical power of modulated LO signal 154 to vary in intensity may be utilized (e.g., sinusoidal modulation, triangular wave modulation, and/or the like, may be used). In some implementations, LO 104 may generate modulated LO signal 154 such that modulated LO signal 154 has a particular polarization.

Mixer 106 includes a component to generate a pair of mixed optical signals 156 (e.g., mixed optical signal 156-1 and mixed optical signal 156-2 are shown in FIG. 1). In some implementations, mixer 106 may generate the pair of mixed optical signals 156 based on mixing modulated LO signal 154 and an input optical signal 150. In some implementations, mixer 106 may be a waveguide mixer (e.g., a 2×2 waveguide splitter).

Optical detector 108 includes a component to receive a pair of mixed optical signals 156 associated with input optical signal 150, and provide, based on the pair of mixed optical signals 156, an electrical signal 158 (e.g., first electrical signal) corresponding to a coherent mixture of input optical signal 150 and modulated LO signal 154. In some implementations, optical detector 108 may include a pair of photodetectors, each arranged to receive one of the pair of mixed optical signals 156 (e.g., a first photodetector to receive mixed optical signal 156-1 and a second photodetector to receive mixed optical signal 156-2). In some aspects, optical detector 108 may generate electrical signal 158 based on the pair of mixed optical signals 156. In some implementations, electrical signal 158 is formed from the subtraction of photocurrent of the second photodetector from the photocurrent of the first photodetector. In some implementations, electrical signal 158 may comprise a beat noise associated with input optical signal 150 when modulated LO signal 154 is in the first state (e.g., a lower power state), and the beat noise plus input optical signal 150 when modulated LO signal 154 is in the second state (e.g., a higher power state). In some implementations, as described in further detail below, electrical signal 158 output by optical detector 108 may be analyzed synchronously with modulation signal 152 (i.e., synchronously with the modulation of modulated LO signal 154) in order to remove the beat noise in association with monitoring the optical power spectrum of input optical signal 150.

Synchronous demodulator 114 includes a component (e.g., a lock-in amplifier or the like) to receive electrical signal 158 and modulation signal 152, and provide, based on electrical signal 158 and modulation signal 152, electrical signal 160 (e.g., a second electrical signal). As indicated in FIG. 1, electrical signal 160 may be representative of an optical power spectrum of input optical signal 150. Thus, synchronous demodulator 114 may include a component capable of synchronously comparing electrical signal 158 and modulation signal 152 in order to generate electrical signal 160 from which the beat noise has been removed, and which is representative of the optical power spectrum of input optical signal 150.

In some aspects, the optical power spectrum of input optical signal 150 may be used to derive a signal optical power associated with input optical signal 150, a signal to noise ratio associated with input optical signal 150, a channel center wavelength associated with input optical signal 150, a width of a channel wavelength in input optical signal 150, a signal modulation format associated with input optical signal 150, and/or the like.

In an example of operation, assume that OCM 100 is to scan a set of wavelength channels in a bandwidth associated with input optical signal 150 in order to detect an optical power spectrum of input optical signal 150 (e.g., such that optical characteristics of a given wavelength channel can be determined).

As shown in FIG. 1, during the scanning by OCM 100, modulator 102 provides modulation signal 152 to LO 104. As further shown, modulator 102 also provides modulation signal 152 to synchronous demodulator 114. LO 104 receives modulation signal 152 and provides modulated LO signal 154. As described above, in some implementations, modulated LO signal 154 may be created such that an intensity of modulated LO signal 154 varies in time between a first state (e.g., a lower power state) and a second state (e.g., higher power state) according to the frequency of modulation signal 152. As further shown in FIG. 1, LO 104 provides modulated LO signal 154 as an input to mixer 106.

As further shown, mixer 106 also receives input optical signal 150 as another input. As described above, input optical signal 150 includes an optical signal (e.g., including one or more wavelength channels) for which an optical power spectrum is to be detected by OCM 100. Mixer 106 mixes input optical signal 150 and modulated LO signal 154 to create a pair of mixed optical signals 156 (e.g., mixed optical signal 156-1 and mixed optical signal 156-2 are shown in FIG. 1). As shown, mixer 106 provides the pair of mixed optical signals 156 to optical detector 108.

Optical detector 108 receives the pair of mixed optical signals 156 and, based on the pair of mixed optical signals 156, generates an electrical signal 158 that, as described below, is synchronously analyzed to measure the optical power spectrum of input optical signal 150. As shown, optical detector 108 provides electrical signal 158 to synchronous demodulator 114.

Synchronous demodulator 114 receives electrical signal 158 and modulation signal 152, and generates electrical signal 160. As described above, electrical signal 160 is an electrical signal (from which the beat noise, associated with input optical signal 150, has been removed) that is representative of the optical power spectrum of input optical signal 150.

The analysis of the electrical signal 158 by synchronous demodulator 114 is synchronous with the frequency of modulated LO signal 154 in order to separately measure beat noise, associated with input optical signal 150, and the beat noise plus input optical signal 150. For example, as shown in FIG. 1, optical detector 108 provides electrical signal 158. Electrical signal 158 is an electrical signal that corresponds to a given wavelength during scanning of the bandwidth associated with input optical signal 150.

As shown, for the given wavelength, electrical signal 158 indicates an optical power of a beat noise associated with input optical signal 150 plus an optical power of modulated LO signal 154 mixed with the input optical signal 150 at the given wavelength (i.e., an optical power of a background level plus an optical power of a signal that is proportional to a segment of the optical spectrum of input optical signal 150, identified as Signal+Background Level in FIG. 1) and an optical power of the beat noise plus an optical power of an attenuated modulated LO signal 154 (i.e., a relatively lower power LO signal) mixed with the input optical signal 150 at the given wavelength (i.e., an optical power of the background level, identified as Attenuated Signal+Background Level in FIG. 1). Here, electrical signal 158 indicates the optical power of the Signal+Background Level during times when modulated LO signal 154 is in the second state (e.g., the higher power state, the on state, and/or the like), and indicates the optical power of the Attenuated Signal+Background Level during times at which modulated LO signal 154 is in the first state (e.g., the lower power state, the off-state, and/or the like).

As shown, electrical signal 158 is provided to synchronous demodulator 114. Synchronous demodulator 114 receives electrical signal 158 and, based on synchronous analysis using modulation signal 152, subtracts the beat noise, associated with input optical signal 150, from electrical signal 158 (e.g., such that electrical signal 160 is representative of the optical power of a wavelength of input optical signal 150 being monitored at a given time). Since the beat noise associated with input optical signal 150 is common mode, a magnitude of the beat noise does not change in response to change in optical power of modulated LO signal 154. Therefore, the beat noise is removed by synchronous demodulator 114 when an optical power measurement associated with modulated LO signal 154 in the first state is subtracted from an optical power measurement associated with modulated LO signal 154 in the second state, leaving only the desired signal. In other words, synchronous demodulator 114 may remove the beat noise by processing electrical signal 158 in order to subtract the background level (e.g., the Attenuated Signal+Background Level) from the background level plus the segment of the optical spectrum of input optical signal 150 (e.g., Signal+Background Level). Synchronous demodulator 114 then provides electrical signal 160 that reflects the removal of the beat noise and is representative of the optical power of input optical signal 150. In some implementations, the synchronous demodulation can be performed by synchronous demodulator 114 in the analog domain or in the digital domain.

Thus, as a result of utilizing intensity modulated LO signal 154, OCM 100 can be used to separately measure a noise baseline (i.e., the Attenuated Signal+Background Level) and input optical signal 150 plus noise (i.e., the Signal+Background Level), and an optical power of input optical signal 150 can be determined (e.g., represented by electrical signal 160) based on a difference between the measurement of the noise baseline and the measurement of input optical signal 150 plus noise.

This procedure can be performed as OCM 100 scans the bandwidth associated with input optical signal 150 in order to allow optical detector 108 to detect the optical power spectrum of input optical signal 150. In some implementations, the optical power spectrum detected by OCM 100 may be used to derive an optical characteristic associated with input optical signal 150 (at a given wavelength channel), such as a signal optical power, a signal to noise ratio, a channel center wavelength, a width of a channel wavelength, a signal modulation format, and/or the like.

Here, removal of the beat noise improves dynamic range of OCM 100 by lowering the noise floor (e.g., as compared to that achievable by a conventional coherent OCM) and/or reduces a required optical power of the LO signal (e.g., since the dynamic range can be improved without increasing LO signal power). The reduction in the required optical power of the LO signal eases performance requirements for associated optics, thus enabling the potential for low cost implementations of OCM 100 (e.g., in PLC, using silicon photonics integrated devices, using integrated optical components, and/or the like).

The number and arrangement of components shown and described in FIG. 1 are provided as examples. In practice, OCM 100 may include additional components, fewer components, different components, differently arranged components, and/or the like, than those shown and described above. Additionally, or alternatively, a set of components (e.g., one or more components) of OCM 100 may perform one or more functions described as being performed by another set of components of OCM 100.

Figure 2:
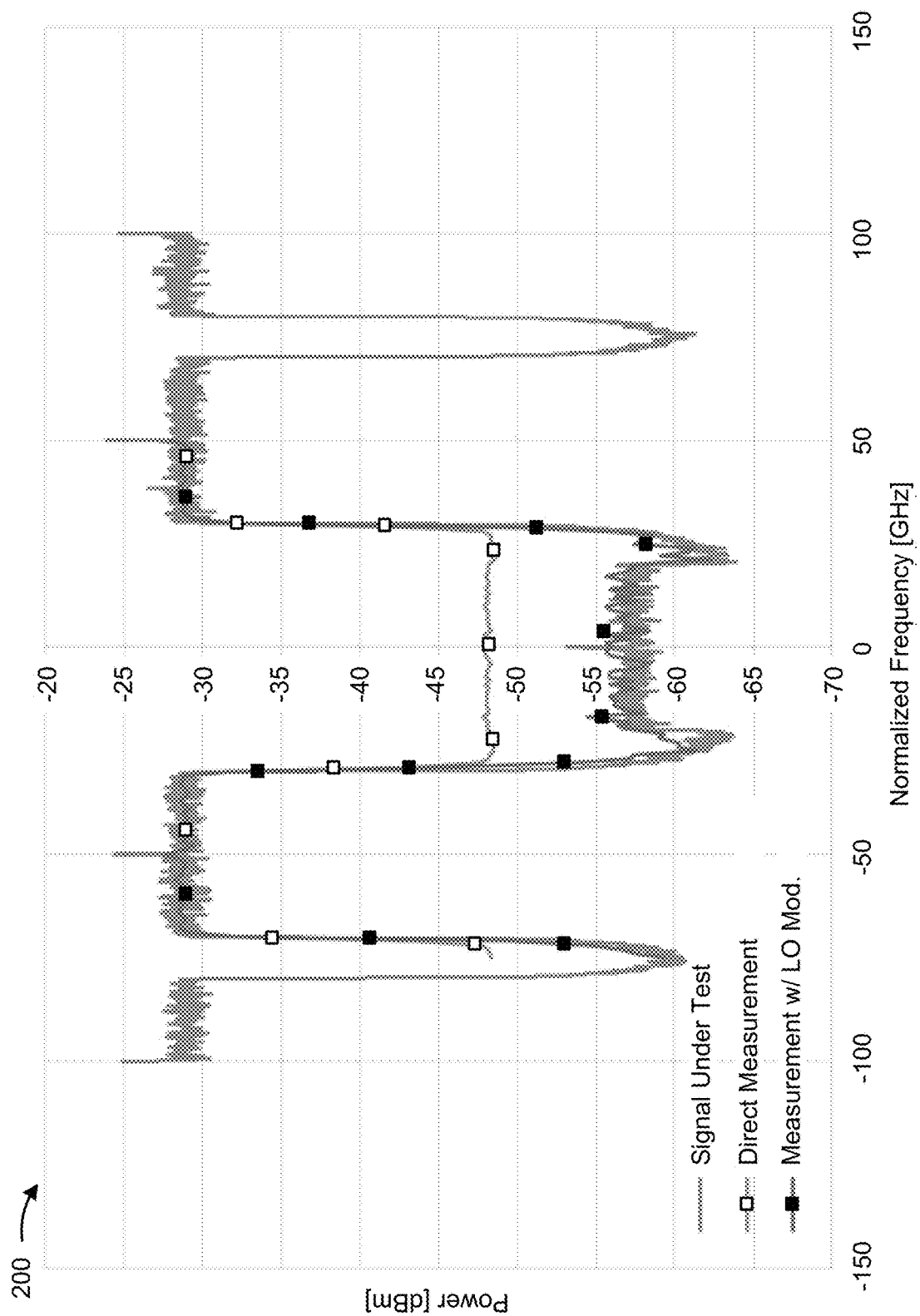
FIG. 2 is a diagram associated with an example simulation illustrating an improvement to dynamic range that can be achieved by the OCM with improved dynamic range described herein.

FIG. 2 is a diagram associated with an example simulation 200 illustrating an improvement to dynamic range that can be achieved by OCM 100. In FIG. 2, the x-axis corresponds to normalized frequency in units of gigahertz (GHz), and the y-axis corresponds to optical power in units of dBm. In example simulation 200, input optical signal 150 includes 83 channels that utilize 4QAM modulation with 0 dBm each, and a 1% tap to OCM 100. In the example shown in FIG. 2, the middle wavelength channel (e.g., a wavelength channel from approximately −25 GHz to approximately 25 GHz) is attenuated by 30 dB. Notably, only three of the 83 channels are fully illustrated in FIG. 2.

The line identified as "Signal Under Test" represents optical power in wavelength channels of input optical signal 150. The line identified as "Direct Measurement" in FIG. 2 is illustrative of a dynamic range achievable using a conventional coherent OCM (i.e., the conventional coherent OCM that does not utilize LO modulation). The line identified as "Measurement w/LO Mod." in FIG. 2 is illustrative of a dynamic range achievable using OCM 100. As shown in FIG. 2, the conventional coherent OCM does not have sufficient dynamic range to capture the middle wavelength channel and, therefore, cannot accurately detect the presence of or the optical power in the middle wavelength channel. Conversely, as shown in FIG. 2, OCM 100 has sufficient dynamic range to correctly measure the optical power in the middle wavelength channel.

As indicated above, FIG. 2 is provided merely as an example. Other examples may differ from what is described with regard to FIG. 2.

Figure 3:
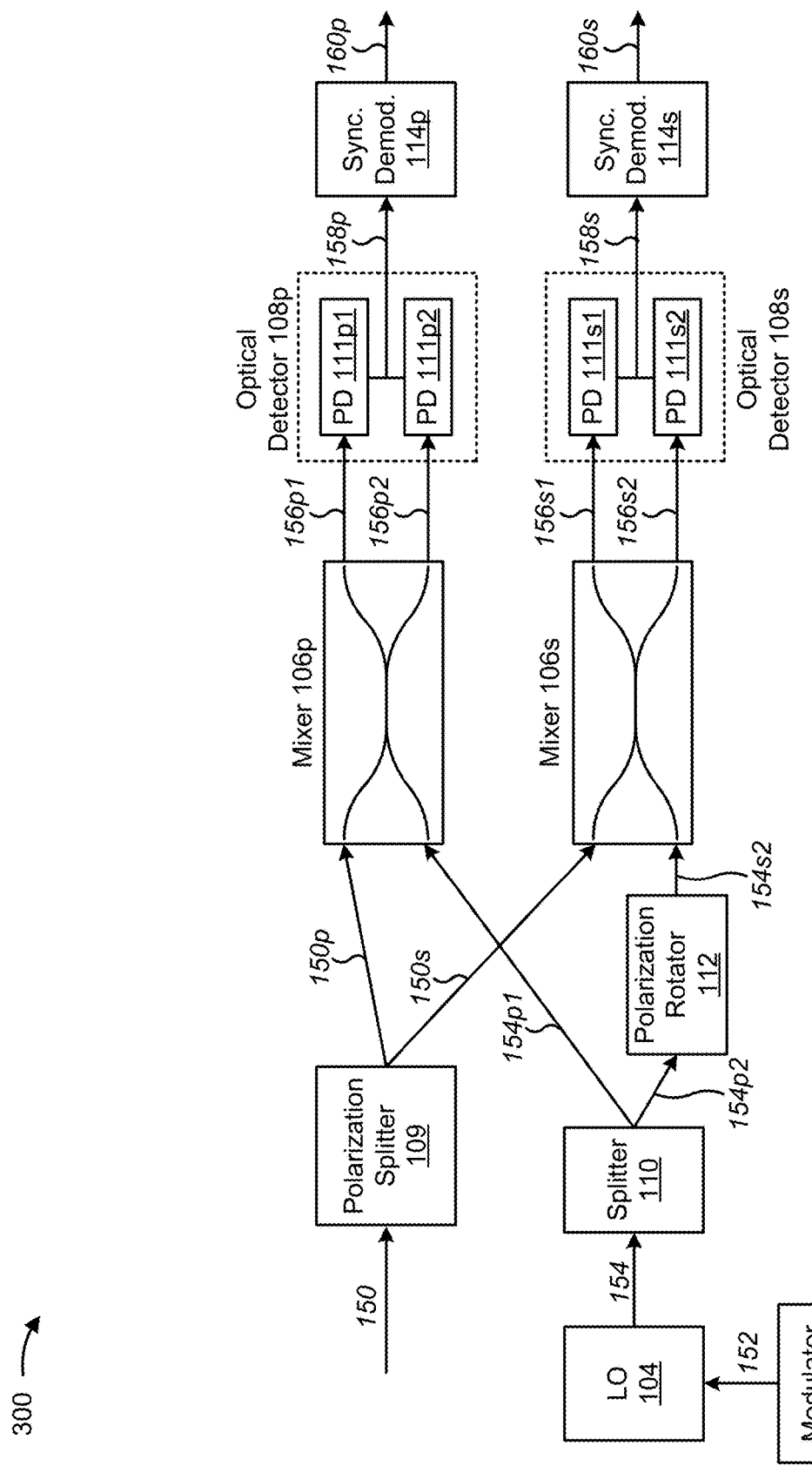
FIG. 3 is a diagram of an example OCM that is capable of detecting an optical power spectrum for different polarizations, with improved dynamic range.

In some implementations, OCM 100 may be utilized in order to detect an optical power spectrum for different polarizations. FIG. 3 is a diagram of an example implementation of OCM 100 that is capable of detecting an optical power spectrum for different polarizations, with improved dynamic range. The example implementation of OCM 100 shown in FIG. 3 is herein referred to as OCM 300.

As shown in FIG. 3, OCM 300 may include modulator 102, LO 104, a mixer 106 associated with a first polarization (e.g., mixer 106*p*), a mixer 106 associated with a second polarization (e.g., mixer 106*s*), an optical detector 108 associated with the first polarization (e.g., optical detector 108*p* including a photodetector (PD) 111*p*1 and a PD 111*p*2), an optical detector 108 associated with the second polarization (e.g., optical detector 108*s* including a PD 111*s*1 and a PD 111s2), a synchronous demodulator 114 associated with the first polarization (e.g., synchronous demodulator 114p), a synchronous demodulator 114 associated with the second polarization ((e.g., synchronous demodulator 114s), a polarization splitter 109, a splitter 110, and a polarization rotator 112. Modulator 102, LO 104, mixer 106p, mixer 106s, optical detector 108p, optical detector 108s, synchronous demodulator 114p, and synchronous demodulator 114s may include components similar to those described above in association with FIG. 1. Details of polarization splitter 109, splitter 110, and polarization rotator 112 are described below, followed by a description of an example operation of OCM 300.

Polarization splitter 109 includes an optical component to split an optical signal based on polarization. For example, polarization splitter may include a component capable of splitting input optical signal 150 into a portion of input optical signal 150 having a first polarization (identified as input optical signal 150p in FIG. 3) and a portion of input optical signal 150 having the second polarization (identified as input optical signal 150s in FIG. 3). As shown in FIG. 3, polarization splitter 109 may be arranged to provide input optical signal 150p as an input to mixer 106p, and to provide input optical signal 150s as an input to mixer 106s.

Splitter 110 includes an optical component to split an optical signal (e.g., into at least two portions of approximately equal optical power). For example, when modulated LO signal 154 has the first polarization, splitter 110 may include an optical component capable of splitting modulated LO signal 154 into a first portion having the first polarization (identified as modulated LO signal 154p1 in FIG. 3) and a second portion of modulated LO signal 154 having the first polarization (identified as modulated LO signal 154p2 in FIG. 3). As shown in FIG. 3, splitter 110 may be arranged to provide modulated LO signal 154p1 as an input to mixer 106p, and to provide modulated LO signal 154p2 as an input to polarization rotator 112.

Polarization rotator 112 includes an optical component to rotate a polarization of an optical signal. For example, polarization rotator 112 may include a component capable of rotating a polarization of modulated LO signal 154p2 to create a portion of modulated LO signal 154 having a second polarization (identified as modulated LO signal 154s2 in FIG. 3).

In an example of operation, assume that OCM 300 is to scan a set of wavelength channels in a bandwidth associated with input optical signal 150 in order to detect an optical power spectrum of input optical signal 150 in the first polarization and the second polarization (e.g., such that optical characteristics of a given wavelength channel can be determined for each polarization).

As shown in FIG. 3, and similar to the manner described above, modulator 102 provides modulation signal 152 to LO 104, as well as to synchronous demodulator 114p and synchronous demodulator 114s. LO 104 receives modulation signal 152 and provides modulated LO signal 154. In this example, LO 104 creates modulated LO signal 154 such that modulated LO signal 154 has the first polarization (i.e., such that modulated LO signal 154 is p-polarized). As further shown, LO 104 provides modulated LO signal 154 as an input to splitter 110.

Splitter 110 receives modulated LO signal 154 and splits modulated LO signal 154 into modulated LO signal 154p1 and modulated LO signal 154p2. As shown, modulated LO signal 154p1 is provided as an input to mixer 106p, and modulated LO signal 154p2 is provided as an input to polarization rotator 112. As further shown, polarization rotator 112 receives modulated LO signal 154p2 and rotates the polarization of modulated LO signal 154p2 in order to create modulated LO signal 154s2. As shown, polarization rotator 112 provides modulated LO signal 154s2 as an input to mixer 106s.

As further shown in FIG. 3, input optical signal 150 is provided as an input to polarization splitter 109, and polarization splitter 109 splits input optical signal 150 into input optical signal 150p and input optical signal 150s. As shown, input optical signal 150p is provided as an input to mixer 106p, and input optical signal 150s is provided as an input to mixer 106s.

Mixer 106p mixes input optical signal 150p and modulated LO signal 154p1 to create a pair of mixed optical signals 156 associated with the first polarization (identified as mixed optical signal 156p1 and mixed optical signal 156p2 in FIG. 3). As shown, mixer 106p provides mixed optical signal 156p1 to PD 111p1 of optical detector 108p and provides mixed optical signal 156p2 to PD 111p2 of optical detector 108p.

Mixer 106s mixes input optical signal 150s and modulated LO signal 154s2 to create a pair of mixed optical signals 156 associated with the second polarization (identified as mixed optical signal 156s1 and mixed optical signal 156s2 in FIG. 3). As shown, mixer 106s provides mixed optical signal 156s1 to PD 111s1 of optical detector 108s and provides mixed optical signal 156s2 to PD 111s2 of optical detector 108s.

Optical detector 108p (i.e., PD 111p1 and PD 111p2) receives mixed optical signal 156p1 and mixed optical signal 156p2, and provides electrical signal 158p, associated with input optical signal 150p, based on mixed optical signal 156p1 and mixed optical signal 156p2. Optical detector 108p provides electrical signal 158p to synchronous demodulator 114p.

Synchronous demodulator 114p receives modulation signal 152 and electrical signal 158p and, as described above, analyzes electrical signal 158p of optical detector 108p synchronously with the frequency of modulated LO signal 154 in order to separately measure beat noise, associated with input optical signal 150p, and the beat noise plus input optical signal 150p. As shown, and similar to the manner described above, synchronous demodulator 114p may, based removing beat noise associated with input optical signal 150p from electrical signal 158p, provide electrical signal 160p that is representative of the optical power spectrum of input optical signal 150p.

Optical detector 108s (i.e., PD 111s1 and PD 111s2) receives mixed optical signal 156s1 and mixed optical signal 156s2, and provides electrical signal 158s associated with input optical signal 150s, based on mixed optical signal 156s1 and mixed optical signal 156s2. Optical detector 108s provides electrical signal 158s to synchronous demodulator 114s.

Synchronous demodulator 114s receives modulation signal 152 and electrical signal 158s and, as described above, analyzes electrical signal 158s of optical detector 108s synchronously with the frequency of modulated LO signal 154 in order to separately measure beat noise, associated with input optical signal 150s, and the beat noise plus input optical signal 150s. As shown, and similar to the manner described above, synchronous demodulator 114s may, based on removing beat noise associated with input optical signal 150s from electrical signal 158s, provide electrical signal 160s that is representative of the optical power spectrum of input optical signal 150s.

In this way, OCM 300 may be utilized in order to detect an optical power spectrum for different polarizations of input optical signal 150, with improved dynamic range.

The number and arrangement of components shown and described in FIG. 3 are provided as examples. In practice, OCM 300 may include additional components, fewer components, different components, differently arranged components, and/or the like, than those shown and described above. Additionally, or alternatively, a set of components (e.g., one or more components) of OCM 300 may perform one or more functions described as being performed by another set of components of OCM 300.

Figure 4:
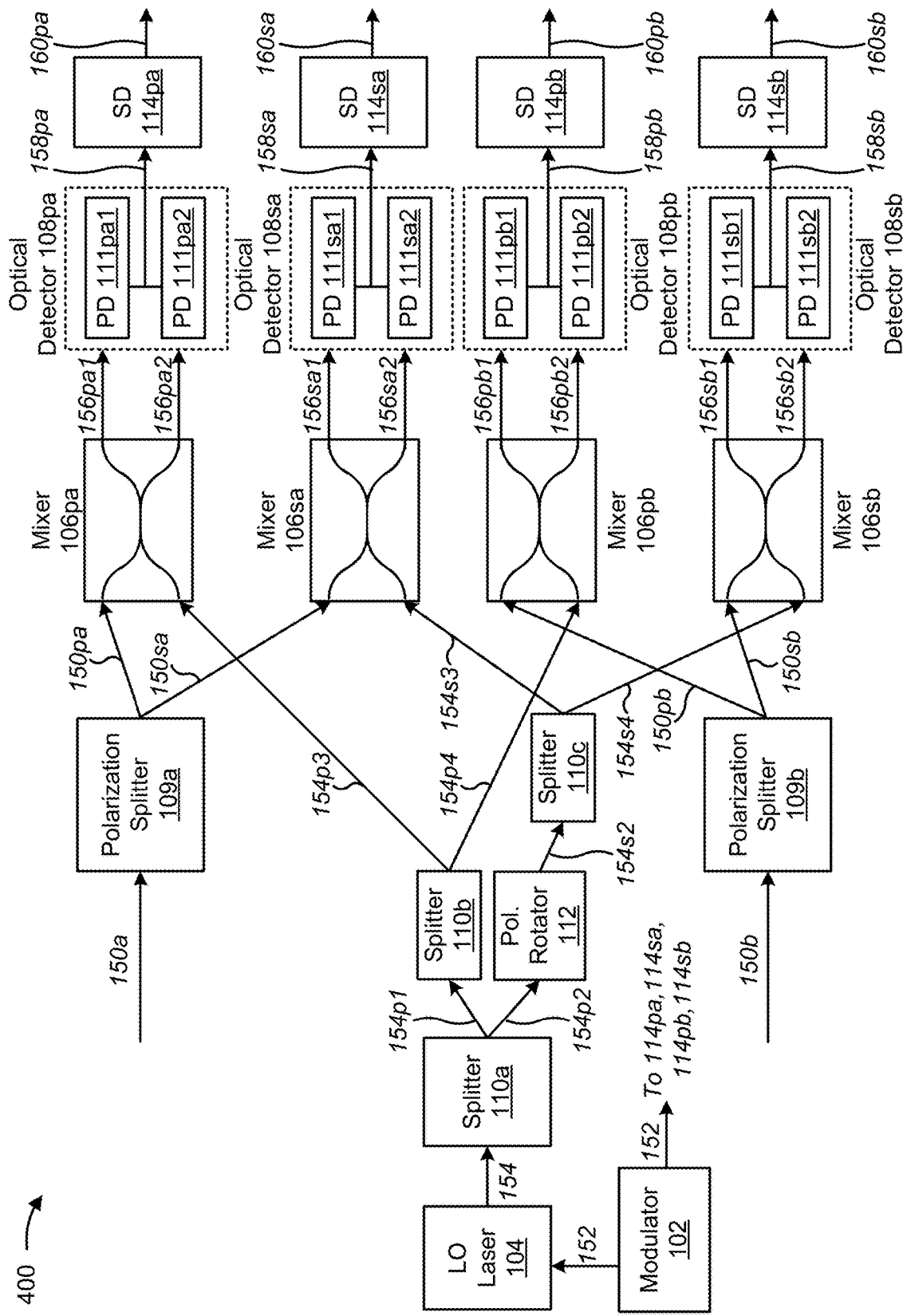
FIG. 4 is a diagram of an example OCM that is capable of detecting an optical power spectrum for multiple input optical signals, with improved dynamic range.

In some implementations, the reduction in the required optical power of the signal to be provided by LO 104 allows modulated LO signal 154 to be split into N (N≥2) paths, which enables simultaneous monitoring of N input optical signals. FIG. 4 is a diagram of an example implementation of OCM 100 that is capable of detecting an optical power spectrum for N input optical signals 150, with improved dynamic range. The implementation of OCM 100 shown in FIG. 4 is herein referred to as OCM 400.

As shown in FIG. 4, OCM 400 may include modulator 102, LO 104, a first mixer 106 associated with a first polarization (e.g., mixer 106pa), a first mixer 106 associated with a second polarization (e.g., mixer 106sa), a second mixer 106 associated with the first polarization (e.g., mixer 106pb), a second mixer 106 associated with the second polarization (e.g., mixer 106sb). As further shown, OCM 400 may include a first optical detector 108 associated with the first polarization (e.g., optical detector 108pa including a PD 111pa1 and a PD 111pa2), a first optical detector 108 associated with the second polarization (e.g., optical detector 108sa including a PD 111sa1 and a PD 111sa2), a second optical detector 108 associated with the first polarization (e.g., optical detector 108pb including a PD 111pb1 and a PD 111pb2), and a second optical detector 108 associated with the second polarization (e.g., optical detector 108sb including a PD 111sb1 and a PD 111sb2). As further shown, OCM 400 may include a first synchronous demodulator 114 associated with the first polarization (e.g., synchronous demodulator 114pa), a second synchronous demodulator 114 associated with the first polarization (e.g., synchronous demodulator 114sa), a first synchronous demodulator 114 associated with the second polarization (e.g., synchronous demodulator 114pb), and a second synchronous demodulator 114 associated with the second polarization ((e.g., synchronous demodulator 114sb). As further shown, OCM 400 may include a polarization splitter 109 associated with a first input optical signal 150 (e.g., polarization splitter 109a associated with input optical signal 150a), a polarization splitter 109 associated with a second input optical signal 150 (e.g., polarization splitter 109b associated with input optical signal 150b). As further shown, OCM 400 may include a first splitter 110 (e.g., splitter 110a), a second splitter 110 (e.g., splitter 110b), a third splitter 110 (e.g., splitter 110c), and polarization rotator 112. These components may include components similar to those described above in association with FIGS. 1 and 3.

In an example of operation, assume that OCM 400 is to scan a set of wavelength channels in a bandwidth associated with input optical signal 150a and input optical signal 150b in order to detect an optical power spectrum of each input optical signal 150 in the first polarization and the second polarization (e.g., such that optical characteristics for each polarization of a given wavelength channel in each input optical signal 150 can be determined).

As shown in FIG. 4, and similar to the manner described above, modulator 102 provides modulation signal 152 to LO 104, as well as to synchronous demodulator 114pa, synchronous demodulator 114sa, synchronous demodulator 114ps, and synchronous demodulator 114sb. LO 104 receives modulation signal 152 and provides modulated LO signal 154. In this example, LO 104 creates modulated LO signal 154 such that modulated LO signal 154 has the first polarization (i.e., such that modulated LO signal 154 is p-polarized). As further shown, LO 104 provides modulated LO signal 154 as an input to splitter 110a.

Splitter 110a receives modulated LO signal 154 and splits modulated LO signal 154 into modulated LO signal 154p1 and modulated LO signal 154p2. As shown, modulated LO signal 154p1 is provided as an input to splitter 110b, and modulated LO signal 154p2 is provide as an input to polarization rotator 112.

Splitter 110b receives modulated LO signal 154p1 and splits modulated LO signal 154p1 into modulated LO signal 154p3 and modulated LO signal 154p4. As shown, modulated LO signal 154p3 is provided as an input to mixer 106pa, and modulated LO signal 154p4 is provided as an input to mixer 106pb.

As further shown, polarization rotator 112 receives modulated LO signal 154p2 and rotates the polarization of modulated LO signal 154p2 in order to create modulated LO signal 154s2. As shown, polarization rotator 112 provides modulated LO signal 154s2 as an input to splitter 110c.

Splitter 110c receives modulated LO signal 154s2 and splits modulated LO signal 154s2 into modulated LO signal 154s3 and modulated LO signal 154s4. As shown, modulated LO signal 154s3 is provided as an input to mixer 106sa, and modulated LO signal 154s4 is provided as an input to mixer 106sb.

As further shown in FIG. 4, input optical signal 150a is provided (e.g., via a first port of OCM 400) as an input to polarization splitter 109a, and polarization splitter 109a splits input optical signal 150a into input optical signal 150pa and input optical signal 150sa. As shown, input optical signal 150pa is provided as an input to mixer 106pa, and input optical signal 150sa is provided as an input to mixer 106sa.

As further shown in FIG. 4, input optical signal 150b is provided (e.g., via a second port of OCM 400) as an input to polarization splitter 109b, and polarization splitter 109b splits input optical signal 150b into input optical signal 150pb and input optical signal 150sb. As shown, input optical signal 150pb is provided as an input to mixer 106pb, and input optical signal 150sb is provided as an input to mixer 106sb.

Mixer 106pa mixes input optical signal 150pa and modulated LO signal 154p3 to create a first pair of mixed optical signals 156 associated with the first polarization (identified as mixed optical signal 156pa1 and mixed optical signal 156pa2 in FIG. 4). As shown, mixer 106pa provides mixed optical signal 156pa1 to PD 111pa1 of optical detector 108pa and provides mixed optical signal 156pa2 to PD 111pa2 of optical detector 108pa.

Mixer 106sa mixes input optical signal 150sa and modulated LO signal 154s3 to create a first pair of mixed optical signals 156 associated with the second polarization (identified as mixed optical signal 156sa1 and mixed optical signal 156sa2 in FIG. 4). As shown, mixer 106sa provides mixed optical signal 156sa1 to PD 111sa1 of optical detector 108sa and provides mixed optical signal 156sa2 to PD 111sa2 of optical detector 108sa.

Mixer 106*pb* mixes input optical signal 150*pb* and modulated LO signal 154*p*4 to create a second pair of mixed optical signals 156 associated with the first polarization (identified as mixed optical signal 156*pb*1 and mixed optical signal 156*pb*2 in FIG. 4). As shown, mixer 106*pb* provides mixed optical signal 156*pb*1 to PD 111*01* of optical detector 108*pb* and provides mixed optical signal 156*pb*2 to PD 111*pb*2 of optical detector 108*pb*.

Mixer 106*sb* mixes input optical signal 150*sb* and modulated LO signal 154*s*4 to create a second pair of mixed optical signals 156 associated with the second polarization (identified as mixed optical signal 156*sb*1 and mixed optical signal 156*sb*2 in FIG. 4). As shown, mixer 106*sb* provides mixed optical signal 156*sb*1 to PD 111*sb*1 of optical detector 108*sb* and provides mixed optical signal 156*sb*2 to PD 111*sb*2 of optical detector 108*sb*.

Optical detector 108*pa* (i.e., PD 111*pa*1 and PD 111*pa*2) receives mixed optical signal 156*pa*1 and mixed optical signal 156*pa*2, and provides electrical signal 158*pa*, associated with input optical signal 150*pa*, based on mixed optical signal 156*pa*1 and mixed optical signal 156*pa*2. Optical detector 108*pa* provides electrical signal 158*pa* to synchronous demodulator 114*pa*. Synchronous demodulator 114*pa* receives modulation signal 152 and electrical signal 158*pa* and, as described above, analyzes electrical signal 158*pa* of optical detector 108*pa* synchronously with the frequency of modulated LO signal 154 in order to separately measure beat noise, associated with input optical signal 150*pa*, and the beat noise plus input optical signal 150*pa*. As shown, and similar to the manner described above, synchronous demodulator 114*pa* may, based on modulation signal 152 and electrical signal 158*pa*, provide electrical signal 160*pa* that is representative of the optical power spectrum of input optical signal 150*pa*.

Optical detector 108*sa* (i.e., PD 111*sa*1 and PD 111*sa*2) receives mixed optical signal 156*sa*1 and mixed optical signal 156*sa*2, and provides electrical signal 158*sa*, associated with input optical signal 150*sa*, based on mixed optical signal 156*sa*1 and mixed optical signal 156*sa*2. Optical detector 108*sa* provides electrical signal 158*sa* to synchronous demodulator 114*sa*. Synchronous demodulator 114*sa* receives modulation signal 152 and electrical signal 158*sa* and, as described above, analyzes electrical signal 158*sa* of optical detector 108*sa* synchronously with the frequency of modulated LO signal 154 in order to separately measure beat noise, associated with input optical signal 150*sa*, and the beat noise plus input optical signal 150*sa*. As shown, and similar to the manner described above, synchronous demodulator 114*sa* may, based on modulation signal 152 and electrical signal 158*sa*, provide electrical signal 160*sa* that is representative of the optical power spectrum of input optical signal 150*sa*.

Optical detector 108*pb* (i.e., PD 111*pb*1 and PD 111*pb*2) receives mixed optical signal 156*pb*1 and mixed optical signal 156*pb*2, and provides electrical signal 158*pb*, associated with input optical signal 150*pb*, based on mixed optical signal 156*pb*1 and mixed optical signal 156*pb*2. Optical detector 108*pb* provides electrical signal 158*pb* to synchronous demodulator 114*pb*. Synchronous demodulator 114*pb* receives modulation signal 152 and electrical signal 158*pb* and, as described above, analyzes electrical signal 158*pb* of optical detector 108*pb* synchronously with the frequency of modulated LO signal 154 in order to separately measure beat noise, associated with input optical signal 150*pb*, and the beat noise plus input optical signal 150*pb*. As shown, and similar to the manner described above, synchronous demodulator 114*pb* may, based on modulation signal 152 and electrical signal 158*pb*, provide electrical signal 160*pb* that is representative of the optical power spectrum of input optical signal 150*pb*.

Optical detector 108*sb* (i.e., PD 111*sb*1 and PD 111*sb*2) receives mixed optical signal 156*sb*1 and mixed optical signal 156*sb*2, and provides electrical signal 158*sb*, associated with input optical signal 150*sb*, based on mixed optical signal 156*sb*1 and mixed optical signal 156*sb*2. Optical detector 108*sb* provides electrical signal 158*sb* to synchronous demodulator 114*sb*. Synchronous demodulator 114*sb* receives modulation signal 152 and electrical signal 158*sb*, and as described above, analyzes electrical signal 158*sb* of optical detector 108*sb* synchronously with the frequency of modulated LO signal 154 in order to separately measure beat noise, associated with input optical signal 150*sb*, and the beat noise plus input optical signal 150*sb*. As shown, and similar to the manner described above, synchronous demodulator 114*sb* may provide electrical signal 160*sb* that is representative of the optical power spectrum of input optical signal 150*sb*.

In this way, OCM 400 may be utilized in order to detect optical power spectra for different input optical signals 150 and, optionally, on different polarizations of each of the input optical signals 150, with improved dynamic range. Notably, OCM 400 allows for simultaneous detection of optical power spectra for different input optical signals 150 and, therefore, does not require a switching component associated with selecting an input optical signal 150 for detection of optical power spectra. As a result, a cost and complexity of OCM 400 is reduced, while increasing a scanning speed of OCM 400 (e.g., as compared to an implementation requiring selection of an input optical signal 150).

As further illustrated by OCM 400, a single LO 104 can be used to concurrently analyze multiple input optical signals 150 (e.g., provided via different input ports). This is enabled since, as described above, modulating the LO signal improves the dynamic range of OCM 400. As described above, the improved dynamic range means that that an optical power requirement of the LO signal is reduced. Here, since the optical power requirement of the LO signal is reduced, a given LO 104 may be capable of providing modulated LO signal 154 with enough optical power such that modulated LO signal 154 can be split (e.g., into N portions) while maintaining acceptable dynamic range.

Notably, while OCM 400 illustrates an example implementation for detecting optical power spectra for different polarizations of each of two (N=2) input optical signals 150, other implementations are possible. For example, detection of optical power spectra (e.g., in a single polarization, separately in each polarization, in both polarizations, and/or the like) for more than two input optical signals 150 can be achieved in a similar manner as that shown in FIG. 4.

Further, while OCM 400 illustrates an example implementation for detecting optical power spectra for different polarizations of each of two input optical signals 150 based on modulated LO signal 154, other implementations are possible. For example, detection of optical power spectra (e.g., in a signal polarization, separately in each polarization, in both polarizations, and/or the like) can be achieved without using modulated LO signal 154. In such a case, OCM 400 may not include modulator 102 and an unmodulated output of LO 104 may be used in association with generating electrical signals 158. In other words, in some implementations, multiple input optical signals 150 can be monitored without modulating an output of LO 104.

The number and arrangement of components shown and described in FIG. 4 are provided as examples. In practice, OCM 400 may include additional components, fewer components, different components, differently arranged components, and/or the like, than those shown and described above. Additionally, or alternatively, a set of components (e.g., one or more components) of OCM 400 may perform one or more functions described as being performed by another set of components of OCM 400.

FIG. 5 is a flow chart of an example process 500 for optical channel monitoring as performed by the improved OCM described herein. In some implementations, one or more process blocks of FIG. 5 may be performed by one or more components of an OCM (e.g., OCM 100).

As shown in FIG. 5, process 500 may include modulating an LO signal using a modulation signal to create a modulated LO signal (block 510). For example, the OCM (e.g., using modulator 102) may modulate an LO signal using a modulation signal (e.g., modulation signal 152) to create a modulated LO signal (e.g., modulated LO signal 154), as described herein.

As further shown in FIG. 5, process 500 may include mixing a portion of an input optical signal and a portion of the modulated LO signal to create a pair of mixed optical signals (block 520). For example, the OCM (e.g., using mixer 106) may mix a portion of an input optical signal (e.g., input optical signal 150) and a portion of the modulated LO signal to create a pair of mixed optical signals (e.g., mixed optical signals 156), as described herein.

As further shown in FIG. 5, process 500 may include providing, based on the pair of mixed optical signals, a first electrical signal corresponding to a coherent mixture of the portion of the input optical signal and the modulated LO signal (block 530). For example, the OCM (e.g., using optical detector 108) may provide, based on the pair of mixed optical signals, a first electrical signal (e.g., electrical signal 158) associated corresponding to a coherent mixture of the portion of the input optical signal and the modulated LO signal, as described herein.

As further shown in FIG. 5, process 500 may include providing, based on the first electrical signal and the modulation signal, a second electrical signal representative of the optical power spectrum of the portion of the input optical signal (block 540). For example, the OCM (e.g., using optical detector 108) may provide, based on the first electrical signal and the modulation signal, a second electrical signal (e.g., electrical signal 160) representative of the optical power spectrum of the portion of the input optical signal, as described herein.

Process 500 may include additional implementations, such as any single implementation or any combination of implementations described below and/or in connection with one or more other processes described elsewhere herein.

In some implementations, the OCM may detect optical power spectra for two polarizations. For example, the portion of the modulated LO signal may have a first polarization and the portion of the input optical signal may have the first polarization. Here, the OCM (e.g., using another mixer 106) may mix another portion of the modulated LO signal (e.g., another portion of modulated LO signal 154) and another portion of the input optical signal (e.g., another portion of input optical signal 150) to create another pair of mixed optical signals (e.g., another pair of mixed optical signals 156), the other portion of the modulated LO signal and the other portion of the input optical signal having a second polarization. The OCM (e.g., using another optical detector 108) may provide, based on the other pair of mixed optical signals, a third electrical signal corresponding to a coherent mixture of the other portion of the input optical signal and the other portion of the modulated LO signal, and may (e.g., using another synchronous demodulator 114) provide, based on the modulation signal and the third electrical signal, a fourth electrical signal representative of the optical power spectrum of the other portion of the input optical signal. In some implementations, the OCM (e.g., using polarization splitter 109) may split an input (e.g., input optical signal 150) into the portion of the input optical signal and the other portion of the input optical signal. In some implementations, the OCM (e.g., using polarization rotator 112) may rotate a polarization of the other portion of the modulated LO signal in order to cause the other portion of the modulated LO signal to have the second polarization.

In some implementations, the OCM may detect optical power spectra for multiple input optical signals. In some implementations, the OCM (e.g., using another mixer 106) may mix a portion of another input optical signal (e.g., another input optical signal 150) and another portion of the modulated LO signal (e.g., another portion of modulated LO signal 154) in order to create another pair of mixed optical signals (e.g., another pair of mixed optical signals 156). Here, the OCM (e.g., using another optical detector 108) may provide, based on the other pair of mixed optical signals, a third electrical signal corresponding to a coherent mixture of the other input optical signal and the other portion of the modulated LO signal. The OCM (e.g., using another synchronous demodulator 114) may provide a fourth electrical signal (e.g., another electrical signal 160) representative of the optical power spectrum of the portion of the other input optical signal.

In some implementations, an output of the optical detector comprises a beat noise associated with the input optical signal when the modulated LO signal is in a first state (e.g., a higher power state) and the beat noise plus the input optical signal when the modulated LO signal is in a second state (e.g., a lower power state).

In some implementations, the optical power spectrum is used to derive at least one of: a signal optical power, a signal to noise ratio, a channel center wavelength, a width of a channel wavelength, or a signal modulation format. In some implementations, the mixer is a waveguide mixer. In some implementations, the OCM is at least partially implemented as an integrated optical device.

In some implementations, a frequency of the modulation signal is in a range from approximately 10 MHz to approximately 100 MHz. In some implementations, the modulation signal utilizes square wave amplitude modulation in association with creating the modulated LO signal.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide an OCM 100 with an improved dynamic range. In some implementations, OCM 100 may utilize an intensity modulated LO signal 154, and synchronous detection at a frequency of the modulation. This allows undesired beat noise to be removed, thereby providing improved dynamic range performance and reducing a required optical power of the LO signal, as described above. As described herein, OCM 100 can be at least partially implemented using integrated optics, which reduces cost and complexity of the improved coherent OCM.

In some implementations, as described herein, OCM 100 reduces the optical power requirement for the LO signal, while maintaining or even improving dynamic range. The reduction in the required optical power of the LO signal eases performance requirements for associated optics, thus enabling the potential for low cost implementations of OCM 100 (e.g., planar lightwave circuit (PLC), silicon photonics integrated parts, integrated optical components, and/or the like). Further, the reduction in the required optical power of the LO signal allows the LO signal to be split to multiple paths, thereby enabling simultaneous monitoring of multiple input optical signals 150, as described herein.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical channel monitor (OCM), comprising:
a modulator to provide a modulation signal;
a local oscillator (LO) to provide a modulated LO signal, the modulated LO signal being created by modulating an LO signal based on the modulation signal;
a mixer to generate a pair of mixed optical signals, the pair of mixed optical signals being generated based on mixing the modulated LO signal and an input optical signal;
an optical detector to provide, based on the pair of mixed optical signals, a first electrical signal corresponding to a coherent mixture of the input optical signal and the modulated LO signal,
the first electrical signal including a beat noise; and
a synchronous demodulator to provide a second electrical signal based on the first electrical signal,
the second electrical signal having the beat noise removed based on the modulation signal, and
the second electrical signal being representative of an optical power spectrum of the input optical signal.

2. The OCM of claim 1, wherein the first electrical signal comprises the beat noise associated with the input optical signal when the modulated LO signal is in a first state and the beat noise plus the input optical signal when the modulated LO signal is in a second state.

3. The OCM of claim 1, wherein the optical power spectrum is used to derive at least one of:
a signal optical power,
a signal to noise ratio,
a channel center wavelength,
a width of a channel wavelength, or
a signal modulation format.

4. The OCM of claim 1, wherein the mixer is a first mixer, the input optical signal is a portion of an input having a first polarization, the modulated LO signal is a portion of a modulated LO output having the first polarization, the pair of mixed optical signals is a first pair of mixed optical signals, the optical detector is a first optical detector, the synchronous demodulator is a first synchronous demodulator, and
wherein the OCM further comprises:
a second mixer to generate a second pair of mixed optical signals based on mixing a portion of the modulated LO output having a second polarization and a portion of the input having the second polarization;
a second optical detector to provide, based on the second pair of mixed optical signals, a third electrical signal corresponding to a coherent mixture of the portion of the input having the second polarization and the portion of the modulated LO signal having the second polarization; and
a second synchronous demodulator to provide, based on the third electrical signal and the modulation signal, a fourth electrical signal that is representative of an optical power spectrum of the portion of the input having the second polarization.

5. The OCM of claim 4, further comprising:
a polarization splitter to split the input into the portion of the input having the first polarization and the portion of the input having the second polarization.

6. The OCM of claim 4, further comprising:
a splitter to split the modulated LO output into the portion of the modulated LO output having the first polarization and another portion of the modulated LO output having the first polarization; and
a polarization rotator to rotate a polarization of the other portion of the modulated LO output having the first polarization to create the portion of the modulated LO output having the second polarization.

7. The OCM of claim 1, wherein the mixer is a first mixer, the modulated LO signal is a first portion of a modulated LO output, the input optical signal is a first input optical signal associated with first input port, the pair of mixed optical signals is a first pair of mixed optical signals, the optical detector is a first optical detector, the synchronous demodulator is a first synchronous demodulator, and wherein the OCM further comprises:
- a second mixer to generate a second pair of mixed optical signals based on mixing a second portion of the modulated LO output and a second input optical signal,
  - the second input optical signal being associated with a second input port;
- a second optical detector to provide, based on the second pair of mixed optical signals, a third electrical signal corresponding to a coherent mixture of the second input optical signal and the second portion of the modulated LO output; and
- a second synchronous demodulator to provide, based on the third electrical signal and the modulation signal, a fourth electrical signal that is representative of an optical power spectrum of the second input optical signal.

8. The OCM of claim 1, wherein the mixer is a waveguide mixer.

9. The OCM of claim 1, wherein the OCM is at least partially implemented as an integrated optical device.

10. The OCM of claim 1, wherein a frequency of the modulation signal is in a range from approximately 10 megahertz (MHz) to approximately 100 MHz.

11. The OCM of claim 1, wherein the modulation signal utilizes square wave amplitude modulation in association with creating the modulated LO signal.

12. The OCM of claim 1, wherein the second electrical signal has the beat noise removed based on a first optical power measurement associated with the modulated signal in a first state and a second optical power measurement associated with the modulated signal in a second state.

13. An optical channel monitor (OCM), comprising:
- a modulator to provide a modulation signal;
- a local oscillator (LO) to provide an LO output,
  - wherein the LO output is a modulated LO signal created by modulating an LO signal, associated with the LO, based on the modulation signal;
- a first mixer to generate a first pair of mixed optical signals based on mixing a first portion of the LO output and a first input optical signal,
  - the first input optical signal being associated with a first port;
- a second mixer to generate a second pair of mixed optical signals based on mixing a second portion of the LO output and a second input optical signal,
  - the second input optical signal being associated with a second port;
- a first optical detector to provide, based on the first pair of mixed optical signals, a first electrical signal corresponding to a coherent mixture of the first input optical signal and the first portion of the LO output,
  - the first electrical signal including a beat noise;
- a second optical detector to provide, based on the second pair of mixed optical signals, a second electrical signal corresponding to a coherent mixture of the second input optical signal and the second portion of the LO output; and
- a first synchronous demodulator to provide a third electrical signal based on the first electrical signal,
  - the third electrical signal having the beat noise removed based on the modulation signal, and
  - the third electrical signal being representative of an optical power spectrum of the first input optical signal.

14. The OCM of claim 13, further comprising:
- a second synchronous demodulator to provide, based on the second electrical signal and the modulation signal, a fourth electrical signal representative of an optical power spectrum of the second input optical signal.

15. The OCM of claim 13, wherein the first mixer and the second mixer are waveguide mixers.

16. The OCM of claim 13, wherein the OCM is at least partially implemented as an integrated optical device.

17. The OCM of claim 13, wherein the third electrical signal has the beat noise removed based on a first optical power measurement associated with the modulated signal in a first state and a second optical power measurement associated with the modulated signal in a second state.

18. A method, comprising:
- modulating, by modulator of an optical channel monitor (OCM) and using a modulation signal, a local oscillator (LO) signal to create a modulated LO signal;
- mixing, by a mixer of the OCM, a portion of an input optical signal and a portion of the modulated LO signal to create a pair of mixed optical signals;
- providing, by an optical detector of the OCM and based on the pair of mixed optical signals, a first electrical signal corresponding to a coherent mixture of the portion of the input optical signal and the portion of the modulated LO signal,
  - the first electrical signal including a beat noise; and
- providing, by a synchronous demodulator, a second electrical signal based on the first electrical signal,
  - wherein the second electrical signal has the beat noise removed based on the modulation signal, and
  - wherein the second electrical signal is representative of an optical power spectrum of the portion of the input optical signal.

19. The method of claim 18, wherein the portion of the modulated LO signal has a first polarization and the portion of the input optical signal has the first polarization, and wherein the method further comprises:
- mixing, by another mixer of the OCM, another portion of the modulated LO signal and another portion of the input optical signal to create another pair of mixed optical signals,
  - the other portion of the modulated LO signal having a second polarization, and
  - the other portion of the input optical signal having the second polarization; and
- providing, by another optical detector of the OCM and based on the other pair of mixed optical signals, a third electrical signal corresponding to a coherent mixture of the other portion of the input optical signal and the other portion of the modulated LO signal; and
- providing, by another synchronous demodulator, a fourth electrical signal based on the third electrical signal and the modulation signal,
  - wherein the fourth electrical signal is representative of an optical power spectrum of the other portion of the input optical signal.

20. The method of claim 19, further comprising:
- splitting an input into the portion of the input optical signal and the other portion of the input optical signal.

21. The method of claim 19, further comprising:
- rotating a polarization of the other portion of the modulated LO signal in order to cause the other portion of the modulated LO signal to have the second polarization.

22. The method of claim 18, further comprising:
mixing, by another mixer, a portion of another input optical signal and another portion of the modulated LO signal in order to create another pair of mixed optical signals,
providing, by another optical detector of the OCM and based on the other pair of mixed optical signals, a third electrical signal corresponding to a coherent mixture of the portion of the other input optical signal and the other portion of the modulated LO signal, and
providing, by another synchronous demodulator, a fourth electrical signal based on the third electrical signal and the modulation signal,
wherein the fourth electrical signal is representative of an optical power spectrum of the portion of the other input optical signal.

23. The method of claim 18, wherein the second electrical signal has the beat noise removed based on a first optical power measurement associated with the modulated signal in a first state and a second optical power measurement associated with the modulated signal in a second state.

\* \* \* \* \*